Patented Dec. 1, 1936

2,062,355

UNITED STATES PATENT OFFICE 2,062,355

PROCESS OF TREATING LUBRICATING AND OTHER OILS

Carleton Ellis, Montclair, N. J., assignor to Standard Oil Development Company, a corporation of Delaware No Drawing. Application June 2, 1932, Serial No. 615,040

22 Claims. (Cl. 196—19)

This invention relates to the refining of petroleum oils and particularly involves the use of solvents preferably consisting of or containing essentially tertiary alcohols.

In the method hereinafter described for performing various refining steps such as dewaxing and the removal of asphalt, I prefer to use liquid tertiary alcohols, particularly aliphatic alcohols such as tertiary butyl and/or tertiary amyl alcohols. These alcohols are liquids which possess relatively low boiling points and can therefore be separated from the heavier oil such as lubricating oil by distillation; furthermore the alcohols can be prepared in abundant supply from petroleum refinery gases of cracking stills and therefore are readily available. They are not unduly inflammable and therefore should be less hazardous than a number of other volatile solvents. Also they are not corrosive. The tertiary butyl alcohol particularly because of its relatively high freezing point possesses other advantageous qualities which will become apparent from the description of the process.

In using these alcohols for the removal of asphalt, wax, and analogous substances I preferably mix the asphalt and/or wax-bearing petroleum distillate and alcohol, heating if necessary to secure solution of the oil in alcohol, then cool the mixture and separate the precipitate which is formed by filtration, decantation or any other convenient method, and finally remove the alcohol from the oil by the simple step of distillation. The alcohol so removed may be used again often without any further purification.

In employing these tertiary alcohols for the extraction of oily constituents of the oil I may in some cases add a small quantity of water (or other liquid in which the oil is relatively insoluble and which is miscible with the alcohols) to the alcohol; then mix the diluted alcohol and oil, heating if necessary to secure solution of the oil in alcohol, and finally cooling. The degree to which the mixture is cooled in this case ordinarily is not as low as for the precipitation of wax, asphalt and analogous substances. On cooling the solution two layers separate, the upper of which is alcohol containing dissolved oil and the lower one is the extracted oil containing some alcohol. These two layers are then separated and the alcohol recovered from both layers by simple distillation. Before using again it must be determined whether or not the alcohol contains the proper quantity of water, or other liquid. This can be easily done by determining the specific gravity or freezing point of the alcohol or by any convenient or suitable method of test. The extracted oil, after separation of the alcohol, is then ready for use, or it may be distilled into various fractions which are required for some particular uses.

The following examples serve to illustrate the process.

*Example 1.—Removal of wax.*—Pressing distillate having a gravity of 38° Bé. at 68° F. and obtained from a Pennsylvania crude oil was mixed at ordinary temperatures with half its volume of tertiary butyl alcohol and the mixture cooled to about 40–45° F. On remaining at this temperature for some time a voluminous precipitate was formed which was found to consist principally of wax and which was separated from the oil by filtration. The clear oil-alcohol solution was further separated into oil and alcohol by distillation.

*Example 2.—Removal of wax and asphalt.*—A quantity of heavy bottoms, obtained by the distillation of a Mid-Continent crude oil to about 20% bottoms and which contained both asphalt and wax, was mixed with tertiary butyl alcohol in the ratio of 1 volume of oil to 5 volumes of alcohol. The mixture was heated to about 110–120° F., to secure complete solution of the oil in the alcohol. During heating the mixture was well agitated. At this temperature all of the asphaltic material did not dissolve, but some separated first as small globules which finally coalesced, particularly on cooling, to a tarry mass. On cooling to 60–65° F. the alcohol, which contained the oil, was separated by decantation. This alcohol solution was further cooled to 45–50° F. and a precipitate of wax was obtained. The precipitate was removed by filtering through cloth, using a slight pressure. The filtrate was afterwards separated by distillation into oil and alcohol, and the latter rendered again available for use.

The original sample of oil was a very dark colored viscous liquid while the oil obtained by this process was much lighter in color, possessed the green cast characteristic of oils of a recognized lubricating type, and was much less viscous.

A two stage process such as is illustrated by Example 2 provides a means of separately collecting asphaltics and waxes.

Various modifications of the process may be made. Thus in some instances I may modify this process by first mixing a lighter distillate, such as kerosene, with the lubricating oil stock being treated. This reduces the viscosity of the oil stock, making it easier to handle, and also appears to increase its solubility in the alcohol. However in the preferred method this addition of kerosene is to be avoided, as it means later the separation of both alcohol and kerosene by fractional distillation.

It should be pointed out also that in the precipitation of wax the alcoholic solution of oil may be cooled to such a low temperature that some crystallization and separation of an alcohol freezing readily such as tertiary butyl alcohol may take place. This is not harmful provided crystallization and separation of the tertiary butyl alcohol does not progress to a degree such that the oil becomes unduly viscous and semi-solid with the result of preventing its separation from the wax and alcohol crystals by filtration or other means. In fact crystallization of the alcohol is desirable in some cases, as these crystals can be used as a filter aid in the filtration step. Separation of the wax and alcohol crystals can be accomplished, as for example, by allowing the mixture to warm slowly up to the melting temperature of the alcohol crystals. The liquid alcohol can then be removed from the solid wax crystals, for example by filtration.

Temperature reduction to a degree sufficient to cause some part of the thinning vehicle to freeze and thus afford a filter aid constitutes a feature of one phase of the present invention.

*Example 3.—Separation of an oil into two constituent parts.*—One volume of lubricating oil, obtained from a Colombian (South American) crude and having a gravity of 24° Bé. at 73° F., was mixed with one and one-half volumes of tertiary butyl alcohol to which was added 5 per cent by volume of water as a diluent. The mixture was heated to about 150–160° F. with constant agitation to secure solution of the oil in alcohol and afterwards allowed to cool to 110–120° F. The mixture was kept at this latter temperature until a sharp separation into two layers had taken place. The lower layer, or oil layer, was withdrawn and the dissolved alcohol separated by distillation. After distillation of the dissolved alcohol the viscosity (Saybolt) of the oil at 210° F. was 79.6 seconds, while that of the original sample at the same temperature was 76.0 seconds. If necessary the oil can be further separated by distillation into a number of fractions as required.

The upper layer, or alcohol solution of extract, can be separated into alcohol and extract by distillation.

The alcohols obtained from both of these distillation steps may be mixed, and after determining that the proper quantity of water is present in the alcohol (and, if necessary, adding water to secure the proper amount), may be used again.

*Example 4.—Use of a mixture of alcohols in refining.*—In another instance 1 volume of this same Colombian lubricating distillate was mixed with 1 volume of solvent consisting of 80 per cent by volume of tertiary butyl alcohol and 20 per cent by volume of tertiary amyl alcohol; 5 per cent by volume of water as a diluent was added to this mixed solvent before using. After heating the mixture to 150–160° F., and at the same time agitating to secure solution of the oil in the solvent, the batch was allowed to cool to 60–65° F. and stand at this temperature until a sharp separation into two layers took place. The lower, or oil, layer was again withdrawn and the dissolved solvent separated by distillation. After separation of the dissolved solvent the viscosity (Saybolt) of the oil at 210° F. was 76.7 seconds.

The upper layer, or alcohol solution of extract, may be separated into alcohol and extract by distillation.

My process so far as it relates to de-waxing and/or de-asphalting petroleum distillates is applicable particularly to those distillates containing 7 to 10 per cent of wax and/or asphalt; though in some instances it can be applied to distillates containing as high as 20 to 30 per cent of wax and/or asphalt. Preferably in each case the petroleum oil forms a major portion of the mixture from which the wax and/or asphalt is being removed.

In one modification of the invention there also may be incorporated a modicum of a wax-crystal modifier, the product derived for example by condensation of lightly-chlorinated paraffin wax with naphthalene (aluminum chloride activator of condensation) being suitable.

*Example 5.—Condensation product of naphthalene and wax as a crystal compacting agent.*— (A) Two volumes of wax-containing pressing distillate from Pennsylvania crude oil was mixed with one volume of tertiary butyl alcohol. (B) Same proportions of oil and alcohol but ½% condensation product based on the weight of the oil was added. (C) Same as (B) except amount of condensation product was doubled. After solution was effected the solutions were chilled to 45–50° F. Wax separated in all three cases but that in (B) and (C) was denser and smaller in volume, the individual crystals being smaller than in (A). As a result of the condensation product the oil in (B) and (C) could be drawn off in large measure from the wax magma and the latter gave up additional oil freely on centrifuging.

Condensation product of naphthalene and wax used in this manner also tends to accelerate the settling of the wax and such quicker settling coupled with a greater degree of consolidation of the wax magma favors the step of dewaxing.

If solvents of higher specific gravity, as for example chlorinated ethylene (dichlor—, $C_2H_4Cl_2$), are employed the wax rises instead of settles and in this case also the upper layer of wax magma is more compact when ½ to 1% of the condensation product, (or thereabouts) is present.

In like manner condensation product of naphthalene and wax may be used when dewaxing with mixed solvents such as tertiary butyl alcohol with tertiary amyl alcohol, ethyl alcohol, isopropyl alcohol, butyl alcohol, or acetone and the like.

From the foregoing it will be evident that according to the present invention I may remove asphalt and wax from an oil either collectively or separately, that I may separate an oil into a useful component part and one which is less desirable and that in dewaxing I may modify crystal structure, settling time and compactness of wax magma by utilizing a crystal compacting agent such as a condensation product of naphthalene and wax.

Further, the invention contemplates, as an intermediate product in the dewaxing of lubricating oils of petroleum origin, an oil carrying a mass of wax and crystals of tertiary butyl alcohol, and also that magma of precipitated and/or crystallized wax and crystals of tertiary butyl alcohol with a diminished proportion of oil.

It is understood that the above examples are for illustrative purposes only, and that I do not wish to limit myself to the particular alcohols exemplified. Neither do I wish to limit myself as to proportions used, temperatures employed, volume of water or other liquid diluent of solvent power modification, such as methyl or ethyl alcohol, glycol, or glycerol, added to the alcohol or mixture of alcohols, and so forth, as these represent changes which now can readily be made in view of the above disclosure.

What I claim is:

1. A process which comprises dissolving petroleum oil containing wax and asphalt in a liquid tertiary alcohol, at a temperature adequate to cause solution, chilling the solution so obtained, whereby wax and asphalt are precipitated, and removing these precipitated substances from the oil.

2. A process which comprises incorporating petroleum oil containing wax and asphalt with a liquid tertiary alcohol, heating during the step of incorporation, cooling, whereby wax and asphalt are precipitated, and removing these precipitated substances from the oil.

3. A process which comprises dissolving petroleum oil containing wax and asphalt in a liquid tertiary alcohol at a temperature adequate to cause solution, cooling, whereby asphalt is precipitated, removing the precipitated asphalt; further cooling, whereby the wax is precipitated, and removing the precipitated wax from said oil.

4. A process which comprises dissolving petroleum oil containing wax and asphalt in tertiary butyl alcohol, heating during the step of incorporation, cooling, whereby the asphalt is precipitated, removing the precipitated asphalt; further cooling, whereby the wax is precipitated, and removing the wax from said oil.

5. A process according to claim 4 in which the asphaltic substances are first precipitated and separated; further cooling whereby a mixture of wax and solid tertiary butyl alcohol is precipitated in part at least in crystalline form, removing this mixture of wax and solid tertiary alcohol, heating this mixture of precipitated wax and alcohol until the solid alcohol becomes liquid, and withdrawing the liquid alcohol from the solid wax.

6. As an intermediate product in the dewaxing of lubricating oils of petroleum origin an oil carrying a mass of wax and crystals of tertiary butyl alcohol.

7. A magma of lubricating oil, wax and crystallized tertiary butyl alcohol.

8. The process which comprises admixing an asphaltic petroleum oil with tertiary butyl alcohol to which has been added a small proportion of water, heating to effect solution, cooling the solution so obtained, whereby separation into two liquid layers occurs, and separating the two layers.

9. Process for dewaxing comprising heating a petroleum oil containing less than 30% wax with a solvent of the class consisting of tertiary butyl alcohol and tertiary amyl alcohol until a homogeneous solution is obtained, cooling the solution to separate wax, removing wax from the solution, and separating the solvent from the oil in said solution.

10. Process according to claim 9 in which the petroleum oil is a distillate.

11. Process according to claim 9 in which the oil and solvent are heated to about 110–160° F. and the solution is cooled to about 40–65° F.

12. Process according to claim 9 in which the solvent comprises a mixture of liquid tertiary alcohols.

13. Process according to claim 9 in which the solution is cooled to a temperature low enough to cause crystallization and separation of the alcohol.

14. Process according to claim 9 in which the oil is first mixed with a lighter distillate.

15. Process for treating petroleum oils containing wax and asphalt comprising mixing said oils with tertiary butyl alcohol, heating the mixture to about 110–120° F., cooling said mixture to 60–65° F., separating the alcohol solution from the separated tar, cooling the separated alcohol solution further to 45–50° F., thereby causing precipitation of the wax, filtering out the wax, and separating the alcohol from the oil in the solution by distillation.

16. Process according to claim 15 in which the petroleum oil is a crude oil residue.

17. Process according to claim 15 in which the amount of solvent employed is 1 to 5 times the volume of oil treated.

18. Process according to claim 15 in which the oil is first mixed with a lighter distillate.

19. Process according to claim 15 in which the alcohol contains water.

20. A process according to claim 1, in which the tertiary alcohol employed is tertiary butyl alcohol.

21. A process according to claim 1, in which the tertiary alcohol employed is tertiary amyl alcohol.

22. The process of separating an asphaltic petroleum oil into two portions of different constitution which comprises dissolving the oil in a liquid tertiary alcohol at a temperature adequate to cause solution, cooling the solution until two layers of different constitution are formed and separating the layers.

CARLETON ELLIS.